(12) United States Patent
Komiya (10) Patent No.: US 7,975,464 B2
(45) Date of Patent: Jul. 12, 2011

(54) GUIDE RAIL FOR CABLE PROTECTION AND GUIDE DEVICE

(75) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 203 days.

(21) Appl. No.: 12/497,054

(22) Filed: Jul. 2, 2009

(65) Prior Publication Data

US 2010/0050589 A1  Mar. 4, 2010

(30) Foreign Application Priority Data

Aug. 28, 2008  (JP) ................................. 2008-219858

(51) Int. Cl.
*F16G 13/16* (2006.01)
*H02G 11/00* (2006.01)

(52) U.S. Cl. ............. 59/78.1; 248/49; 248/51; 191/12 C
(58) Field of Classification Search .................... 59/78.1; 248/49, 51; 191/12 C See application file for complete search history.

(56) References Cited

U.S. PATENT DOCUMENTS

| | | | | |
|---|---|---|---|---|
| 5,649,415 A * | 7/1997 | Pea | ................................. | 59/78.1 |
| 7,310,935 B2 * | 12/2007 | Worms | ........................... | 59/78.1 |
| 7,343,731 B2 * | 3/2008 | Iwami et al. | .................... | 59/78.1 |
| 7,373,770 B2 * | 5/2008 | Iwami et al. | .................... | 59/78.1 |
| 7,426,824 B2 * | 9/2008 | Iwami et al. | .................... | 59/78.1 |
| 2007/0018146 A1 * | 1/2007 | Iwami et al. | .................. | 254/396 |

FOREIGN PATENT DOCUMENTS

WO  03060346 A1  7/2003

* cited by examiner

*Primary Examiner* — David B Jones
(74) *Attorney, Agent, or Firm* — Woodling, Krost and Rust (57) ABSTRACT

A guide rail for a cable protection and guide device in which lateral run out of the cable protection and guide device is suppressed is disclosed and claimed. Excellent traveling stability is realized and sliding of the cable protection and guide device is suppressed so that wear is decreased. Dovetail grooves (110a) are formed in the longitudinal direction of opposite surfaces of a pair of aluminum extrusion molded rails (110). A plurality of resin rollers (140), each shaft-supported by a shaft-supporting member (120), are engaged with the dovetail grooves of the rail (110a) and are movable in the longitudinal direction of the rail.

4 Claims, 11 Drawing Sheets

GUIDE RAIL FOR CABLE PROTECTION AND GUIDE DEVICE

This patent application claims priority to Japanese Patent Application No. 2008-219858 filed Aug. 28, 2008.

TECHNICAL FIELD

The present invention relates to a cable protection and guide device which is used in a machine tool, an electronic device, civil engineering machinery, an industrial robot, a transfer system and the like. The present invention stably and reliably protects and guides a flexible cable (cables), hose (hoses) and the like (hereinafter referred to as only "a cable"). The cable may be an electric cable, an optical fiber cable, or a fluid supply hose. The cable may carry electric energy (electricity), electric signals, liquids, and/or air. The cable protection and guide device suppresses a lateral run out generated when the cable protection and guide device articulates during bending thereof.

BACKGROUND TECHNOLOGY

When a cable is connected to a movable section of a machine tool, civil engineering machinery, or a transfer system, excessive torsion, flexion, and tensile forces are generated so that the cable is damaged and the outer appearance is degraded. Thus a cable protection and guide device which protects and guides these cables is used.

Figure 10:
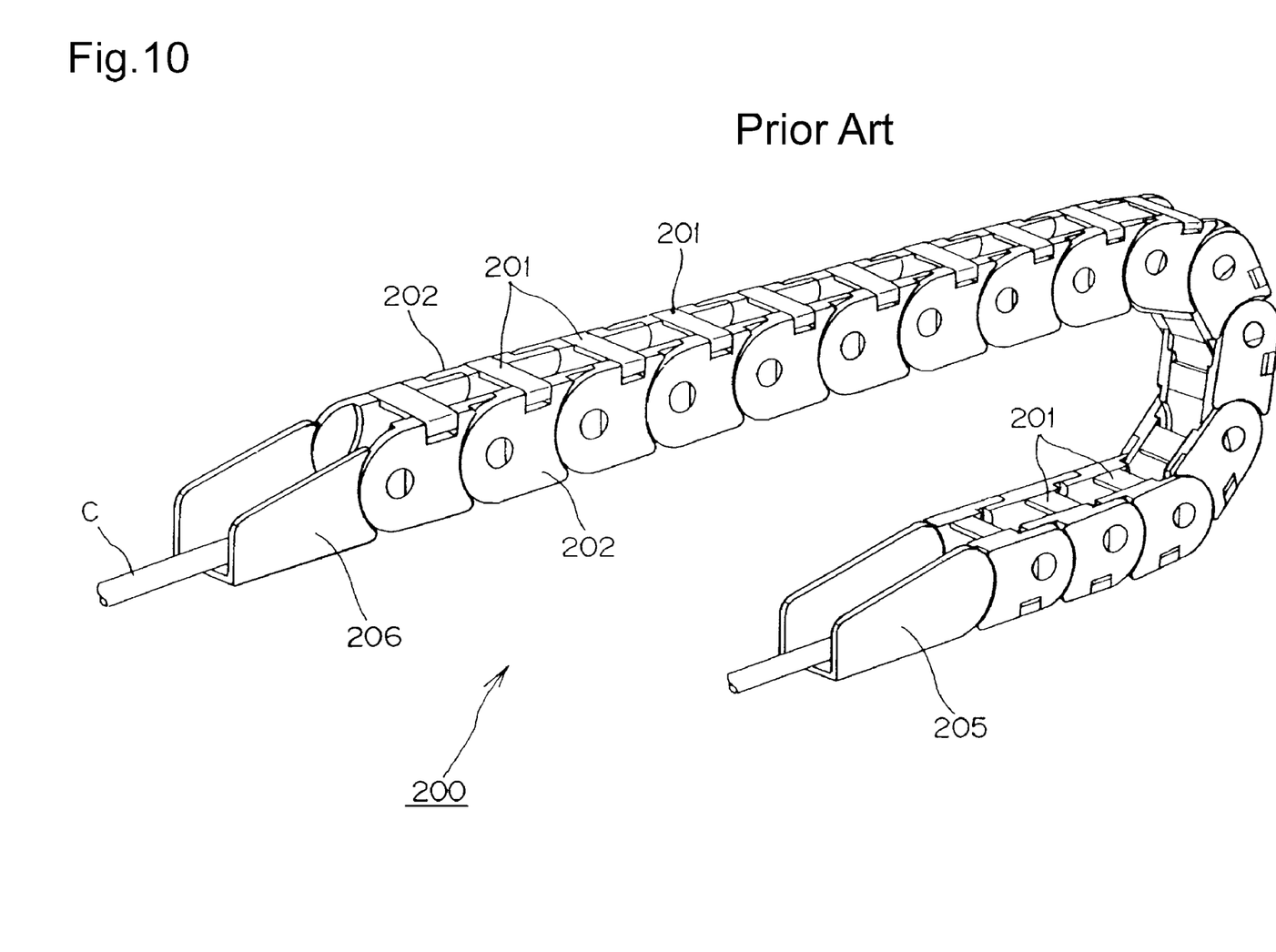
FIG. 10 is a perspective view of a conventional cable protection and guide device.

A cable protection and guide device generally protects and guides a cable C between a movable end 206 and a fixed end 205 as shown in FIG. 10. A number of link frame bodies are employed. Each link frame body is comprised of a pair of link plates disposed on both sides of the cable C and connecting rods 201 are bridged over a flexional outer circumferential side and a flexional inner circumferential side of the link plates. The link frames are connected to each other in the longitudinal direction. The cable C is inserted into the link frame bodies.

When a long cable protection and guide device 200 is used such that it is turned (articulated) between a fixed end 205 and a movable end 206 in the longitudinal direction, flexional inner circumferential surfaces of the turned (articulated) cable protection and guide device 200, and shelf plates of guide rails (not shown) provided for guiding moving paths of the cable protection and guide device 200 are slid therebetween. Sliding hinders smooth reciprocal motion of the cable protection and guide device 200. Sometimes the cable protection and guide device 200 is broken due to excessive wear.

Figure 8:
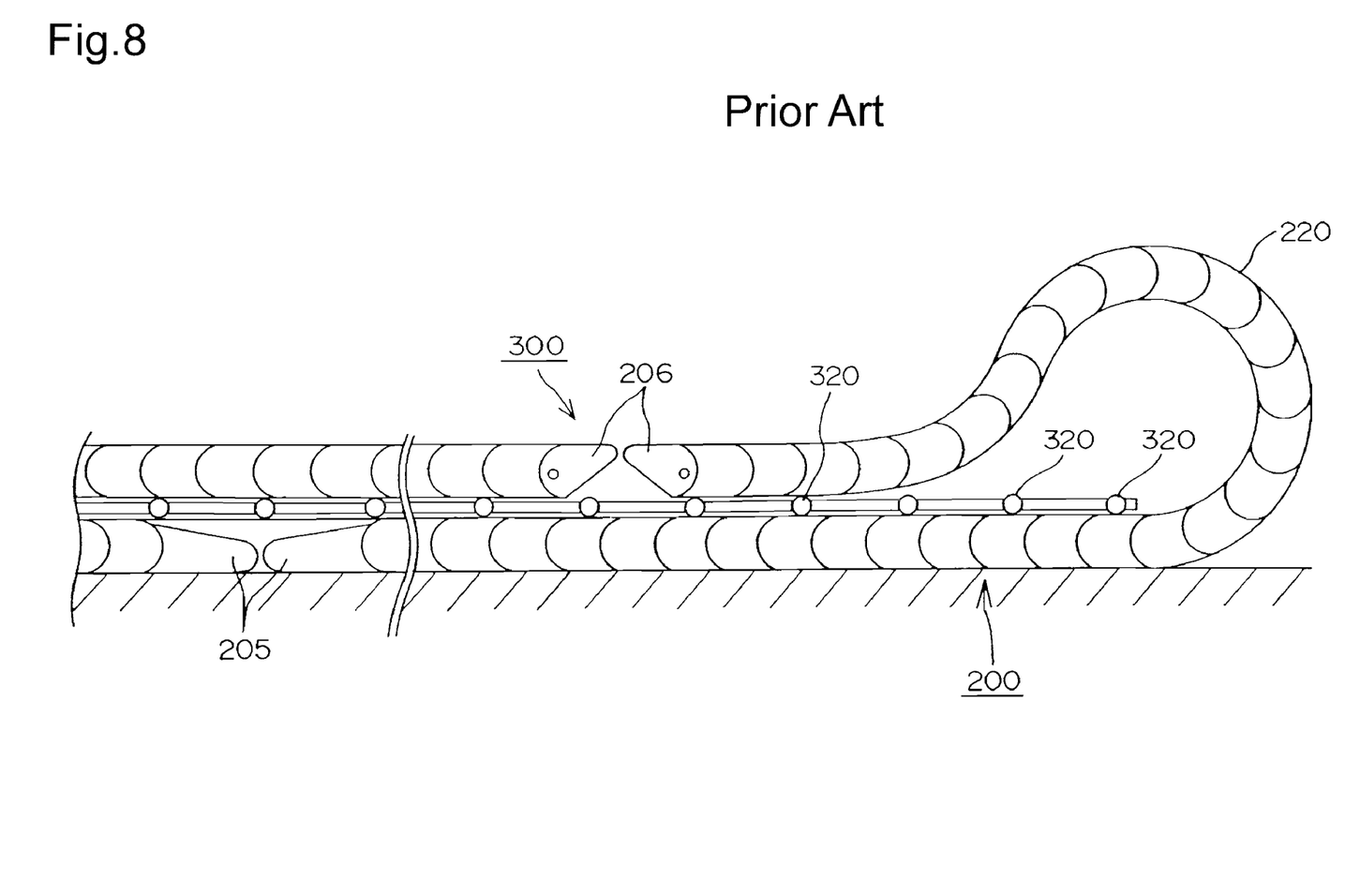
FIG. 8 is a schematic view of a conventional skate unit for a cable protection and guide device.

A skate unit 300 resides between facing cable protection and guide device sections. The skate unit 300 resides between a flexed portion 220 and a movable end 206 of the cable protection and guide device 200. The skate uses a roller 320 to avoid direct contact between upper and lower cable protection and guide device sections. See, Japanese Indication Publication No. 2005-515370 which is disclosed in an information disclosure statement field herewith.

Figure 9:
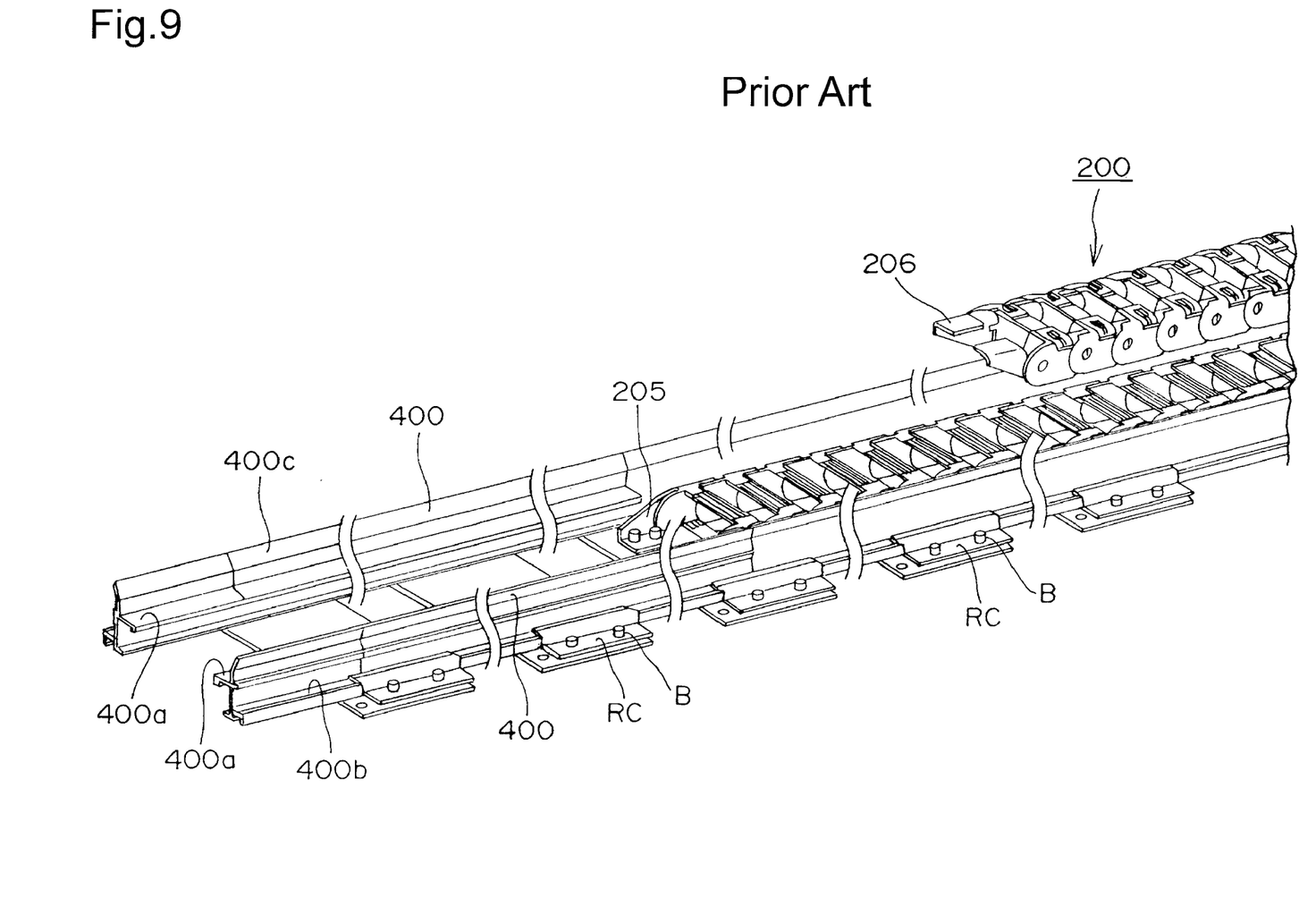
FIG. 9 is a perspective view of a conventional guide rail for a cable protection and guide device.

Further, as shown in FIG. 9, it has been also known to suppress lateral run out of the cable protection and guide device 200 by providing a pair of guide rails 400 each having a mounting section 400b. Rail crank bars RC are mounting members having a crank-shape in section and bolts B are also used.

Problems to be Solved by the Invention

The above-mentioned skate unit 300 is used when a long cable protection and guide device 200 is turned up (articulated) in the longitudinal direction. In this case a long cable protection and guide device 200 has a length on the order of a few tens of meters. Since the cable protection and guide device 200 comprises link frames connected together (which are molded articles as shown in FIG. 10), a problem exists when slight differences between right and left link side plate pitches accumulate and generating lateral bending. When lateral bending occurs the cable protection and guide device 200 drops down off skate unit 300.

Since the flexional inner circumferential surfaces of the cable protection and guide device 200 and the shelf plates 400a of the guide rails slide relative to one another, the flexional inner circumferential surfaces of the cable protection and guide device 200 wear excessively. Lateral run out of the cable protection and guide device 200 results in excessive sliding between link plate 202 and side wall 400C of the guide rail 400 resulting in excessive wear of the link plate.

Accordingly, an object of the present invention is to provide a guide rail for a cable protection and guide device in which a lateral run out of the cable protection and guide device is suppressed so that excellent traveling stability is realized and sliding of the cable protection and guide device is suppressed decreasing wear of the device.

Means for Solving the Problems

The invention solves the above-described problems. A guide rail for a cable protection and guide device includes a pair of aluminum extrusion molded rails which suppress lateral run out of cable protection and guide device. The run out is generated when the cable protection and guide device is used while being turned up (articulated) between the fixed end and the movable end in a longitudinal direction. The cable protection and guide device is formed using a number (plurality) of link frames. Each of the link frames is comprised of a pair of right and left spaced link plates and connecting rods respectively bridged over the flexional outer circumferential sides and the flexional inner circumferential sides of the link plates. The link frames are connected to each other in the longitudinal direction. Dovetail grooves are formed in opposite surfaces of the pair of aluminum extrusion molded rails in the longitudinal direction of the rails. A plurality of resin rollers is employed. Each of the plurality of resin rollers is supported by a supporting pin and a shaft-supporting member. The shaft-supporting members are engaged with the dovetail rail and are movable in the longitudinal direction.

The invention solves the above-mentioned problems in that an elastomer is used as a covering for the outer circumferential surface of the resin roller.

The invention solves the above-mentioned problems in that the outer circumferential surface of the resin roller is reduced (tapered) from the shaft end portion side toward the shaft head portion side.

Effects of the Invention

A guide rail for a cable protection and guide device having a pair of aluminum extrusion molded rails is disclosed. The guide rails suppress lateral run out of a cable protection and guide device. Lateral run out is generated when the cable protection and guide device is used while being turned up (articulated) between a fixed end and a movable end in a longitudinal direction. The cable protection and guide device is formed from a plurality of link frames connected together. Each of the link frames is composed of a pair of right and left spaced link plates. Connecting rods are respectively bridged over a flexional outer circumferential side and a flexional inner circumferential side of the link plates. The link frames are connected to each other in the longitudinal direction. Dovetail grooves are formed in opposite surfaces of the pair of aluminum extrusion molded rails in the longitudinal direction of the rails and a plurality of resin rollers are supported by a pin and a shaft-supported by a shaft-supporting member. The shaft supporting member is engaged with the dovetail rail and is movable and positionable in the longitudinal direction. The supporting shaft member in combination with the supporting pin secure the resin rollers in place where desired. The flexional inner circumferential surface of the cable protection and guide device and the resin roller come into contact with each other so that sliding therebetween is suppressed decreasing wear.

The resin rollers are shaft-supported. The shaft-supporting members are movable and positionable in the longitudinal direction and engage with dovetail grooves formed on opposite surfaces of a pair of aluminum extrusion molded rails in the longitudinal direction. Significant reductions in work manpower for setting the resin rollers are achieved. The number of the resin rollers and the distance between the resin rollers can be optionally set.

Friction between the cable protection and guide device and the guide rail is changed from sliding friction to rolling friction as the pairs of right and left side plates of the link frames engage the rollers stationed along the guide rails. The rolling friction coefficient is about ½0 of the sliding friction coefficient and a smaller motor may be used to drive the cable protection and guide device.

An elastomer layer is provided over the outer circumferential surface of the resin roller. Slip between the resin roller and the flexional inner circumferential surface of the cable protection and guide device is suppressed so that wear of the cable protection and guide device is reduced. Further, sliding noise generated between the resin roller and the flexional inner circumferential surface of the cable protection and guide device is reduced.

The diameter of the outer circumferential surface of the resin roller is reduced (tapered) from the shaft end portion side toward the shaft head portion side such that the force is applied from the resin roller to the middle or center of the guide rails. Thus lateral run out of the cable protection and guide device is suppressed so that excellent traveling stability is realized.

Since sliding between the side link plates of the cable protection and guide device and a side wall surface of the guide rail is suppressed, the generation of wear powder is reduced.

BRIEF DESCRIPTION OF THE DRAWINGS

FIG. 3 is a perspective view of a part of the guide rail for the cable protection and guide device according to Example 1.

DESCRIPTION OF THE INVENTION

Lateral run out of a cable protection guide device is suppressed so that excellent traveling stability is realized. Sliding of the cable protection and guide device is suppressed so that reduction in wear is realized. A guide rail for a cable protection and guide device having a pair of aluminum extrusion molded rails is used. Lateral run out is generated when the cable protection and guide device is used while being turned up (rotated, or articulated, or bent, back upon itself) between a fixed end and a movable end in a longitudinal direction. The cable protection and guide device is formed using a number (plurality) of link frames. Each link frame comprises a pair of right and left spaced link plates and connecting rods respectively bridged over a flexional outer circumferential side and a flexional inner circumferential side of the link plates. Each of the link frames are connected to each other in the longitudinal direction. Dovetail grooves are formed in opposite surfaces of the pair of aluminum extrusion molded rails in the longitudinal direction of the rails. A plurality of resin rollers are supported by a pin and a shaft-supporting member. The plurality of resin rollers are movable and positionable in the longitudinal direction. The supporting shaft member in combination with the supporting pin secure the resin rollers in place where desired.

For example, a guide rail for the cable protection and guide device according to the present invention can be adapted to an engineering plastic cable protection and guide device or to a steel cable protection and guide device.

The guide rail for the cable protection and guide device according to the present invention can be adapted to a link plate and integrally formed connecting rod type, a so-called unit type cable protection and guide device. The guide rail can be also adapted to a type where a link plate is openably provided with respect to a link plate, a so-called opening-closing type cable protection and guide device.

Example 1

Example 1, which is an embodiment of the present invention, will be described with reference to FIGS. 1 to 3.

Figure 1:
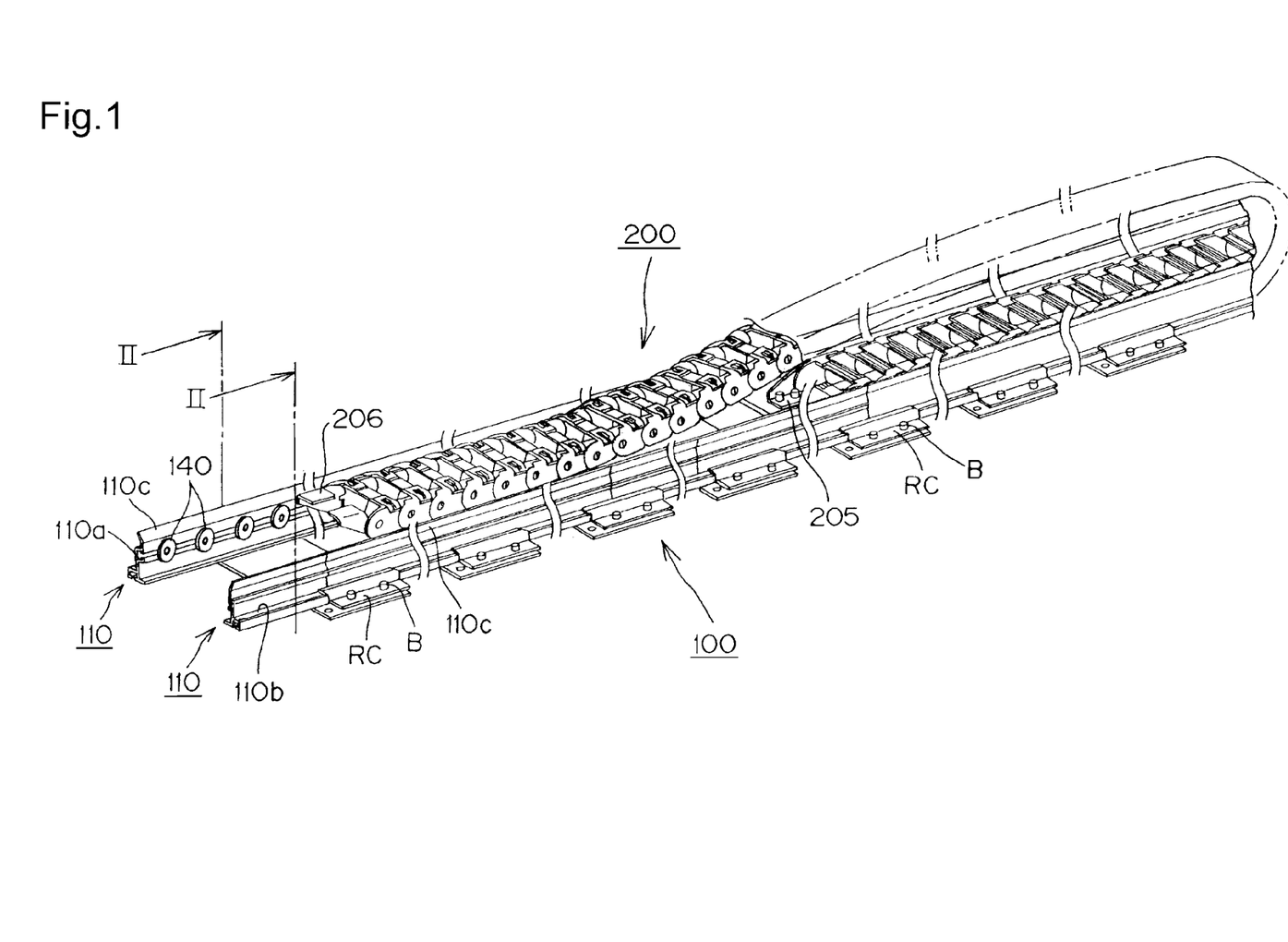
FIG. 1 is an entire perspective view of a guide rail for a cable protection and guide device according to Example 1.

FIG. 1 is an entire perspective view of a guide rail for a cable protection and guide device 100 according to Example 1. FIG. 2 is a cross-sectional view taken along line II-II of the guide rail for the cable protection and guide device 100 shown in FIG. 1. FIG. 3 is a perspective view of a part of the guide rail for the cable protection and guide device 100. FIG. 3(a) shows an exploded perspective view of the resin roller prior to assembly and FIG. 3(b) shows the roller assembled.

The guide rail for a cable protection and guide device 100 of Example 1 is laid on a floor surface along a path of a cable protection and guide device 200. FIG. 1 illustrates the cable protection and guide device 200 turned up (i.e., pulled back on itself) between a fixed end 205 and a movable end 206 in the longitudinal direction, as shown in FIG. 1.

Figure 2:
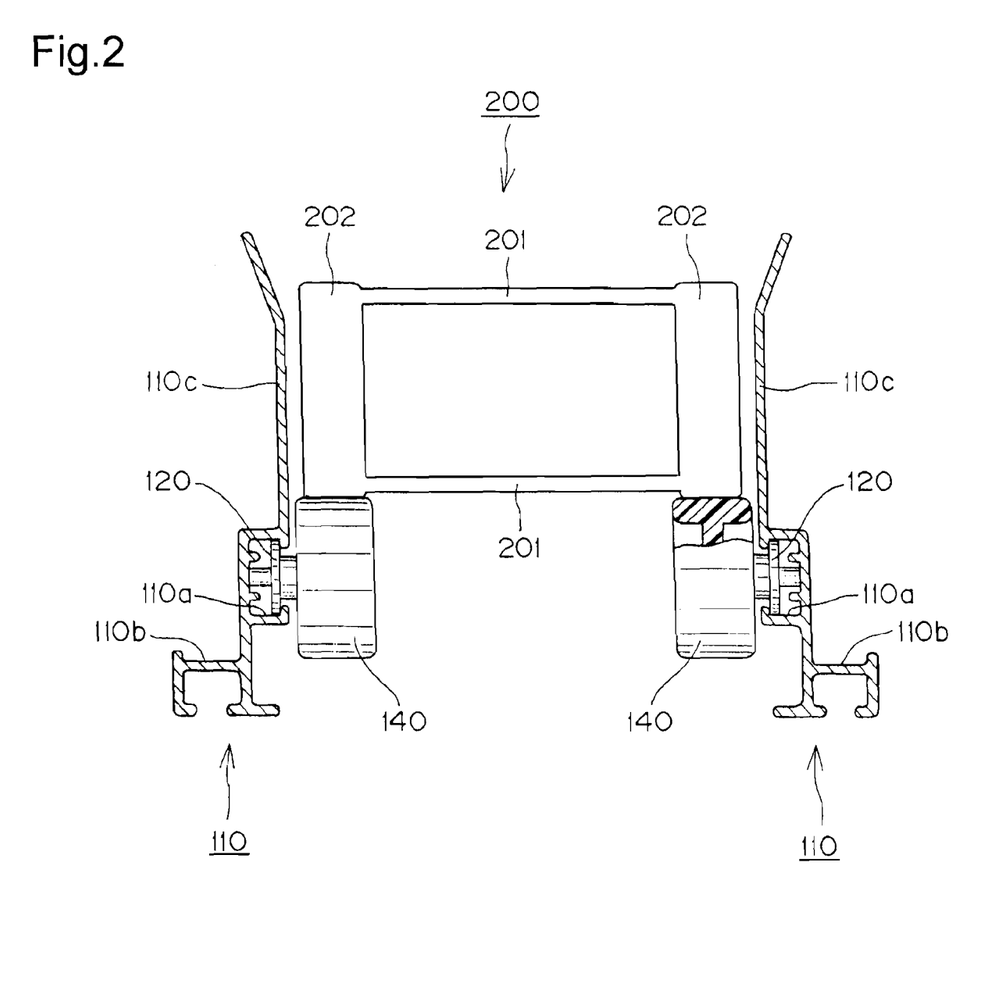
FIG. 2 is a cross-sectional view taken along line II-II in FIG. 1.
Figure 3A:
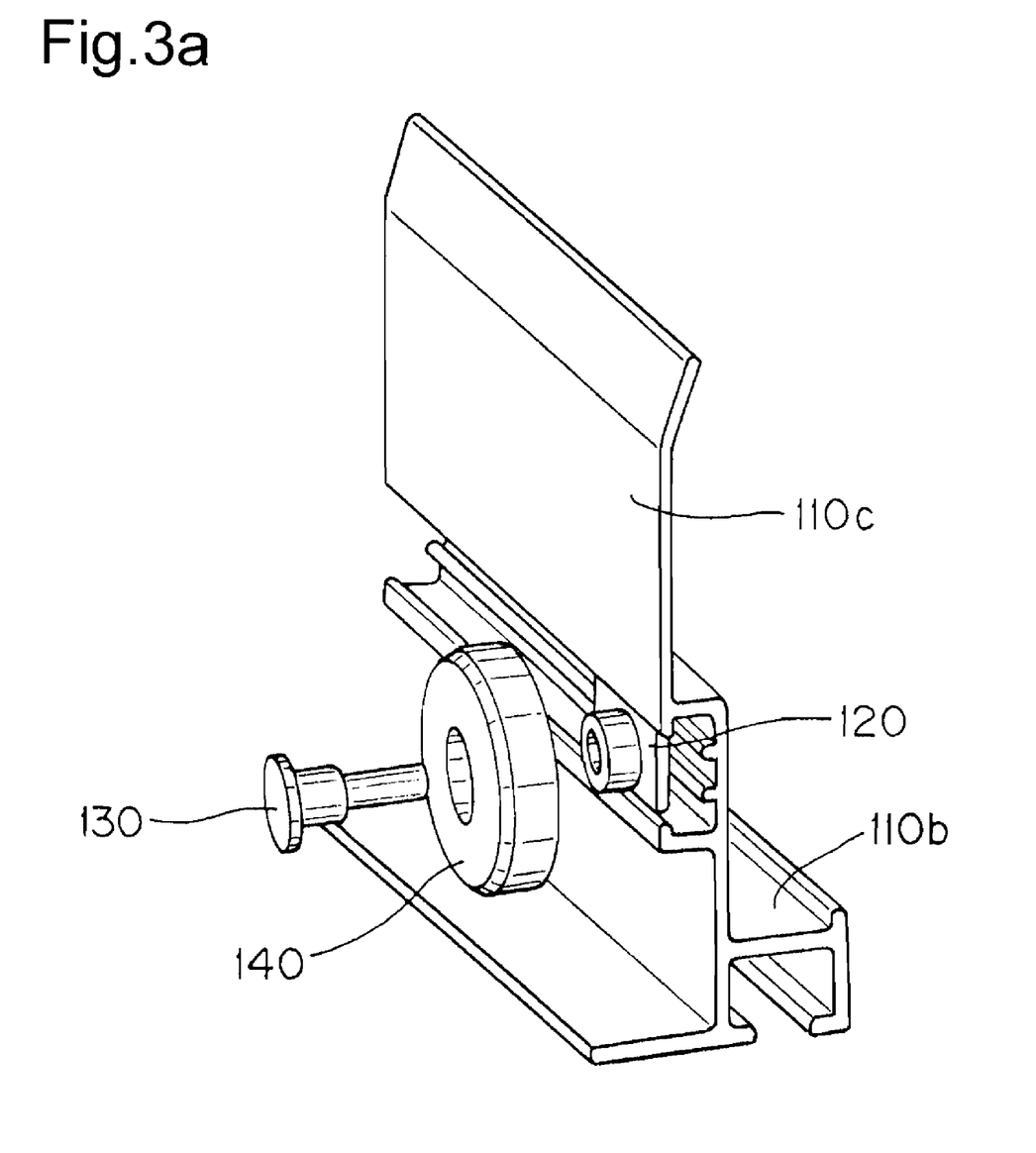
FIG. 3(a) shows an exploded perspective view of the resin roller prior to assembly and FIG. 3(b) shows the roller assembled.
Figure 3B:
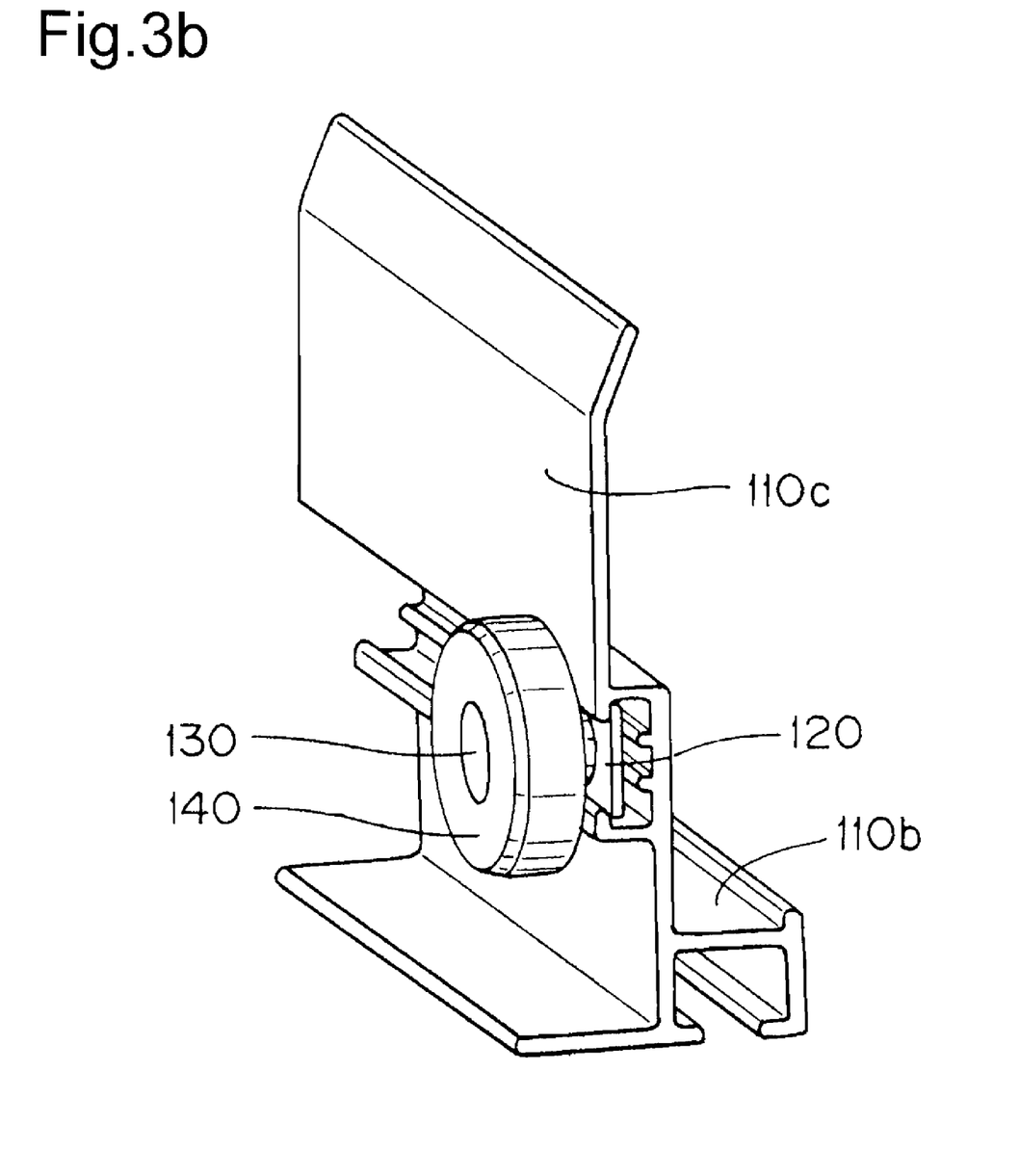

The guide rail for the cable protection and guide device 100 includes a pair of aluminum extrusion molded rails 110 arranged in parallel to each other so as to sandwich the cable protection and guide device 200 as shown in FIGS. 1 to 3. This aluminum extrusion molded rail 110 is composed of a mounting section 110b for fixing it to a mounting surface, a dovetail groove 110a for supporting a resin roller 140 and a side wall 110c which guides the cable protection and guide device 200.

The mounting method of the aluminum extrusion molded rail 110 onto a floor surface is not particularly limited. However, in Example 1 of the present invention, the mounting section 110b of the aluminum extrusion molded rail 110 is fastened to the floor surface with rail crank bars RC by use of tap bolts B. Further, the dovetail groove 110a is movably engaged by a shaft-supporting member 120. Shaft-supporting member supports the resin roller 140 in the longitudinal direction. Resin roller 140 is supported with a supporting pin 130 and with a shaft-supporting member 120 as shown in FIG. 3(*a*). Further, the resin roller 140 is molded of nylon having high hardness and excellent impact resistance.

The guide rails for the cable protection and guide device 100 of Example 1 support flexional inner circumferential surfaces of the cable protection and guide device 200. The cable protection and guide device moves forwardly and backwardly. The resin rollers 140 allow the flexional inner circumferential surfaces of the cable protection and guide device 200 to roll along the cable protection and guide device. Wear of the cable protection and guide device 200 is suppressed and minimized. Resin roller 140 is supported by the pin and the shaft-supporting member 120 which engages with the dovetail groove 110a formed in the aluminum extrusion molded rail 110. An optimal number of resin rollers 140 can be provided at optimal distances.

Example 2

Next, Example 2, which is another embodiment of the present invention, will be described with reference to FIG. 4.

Figure 4:
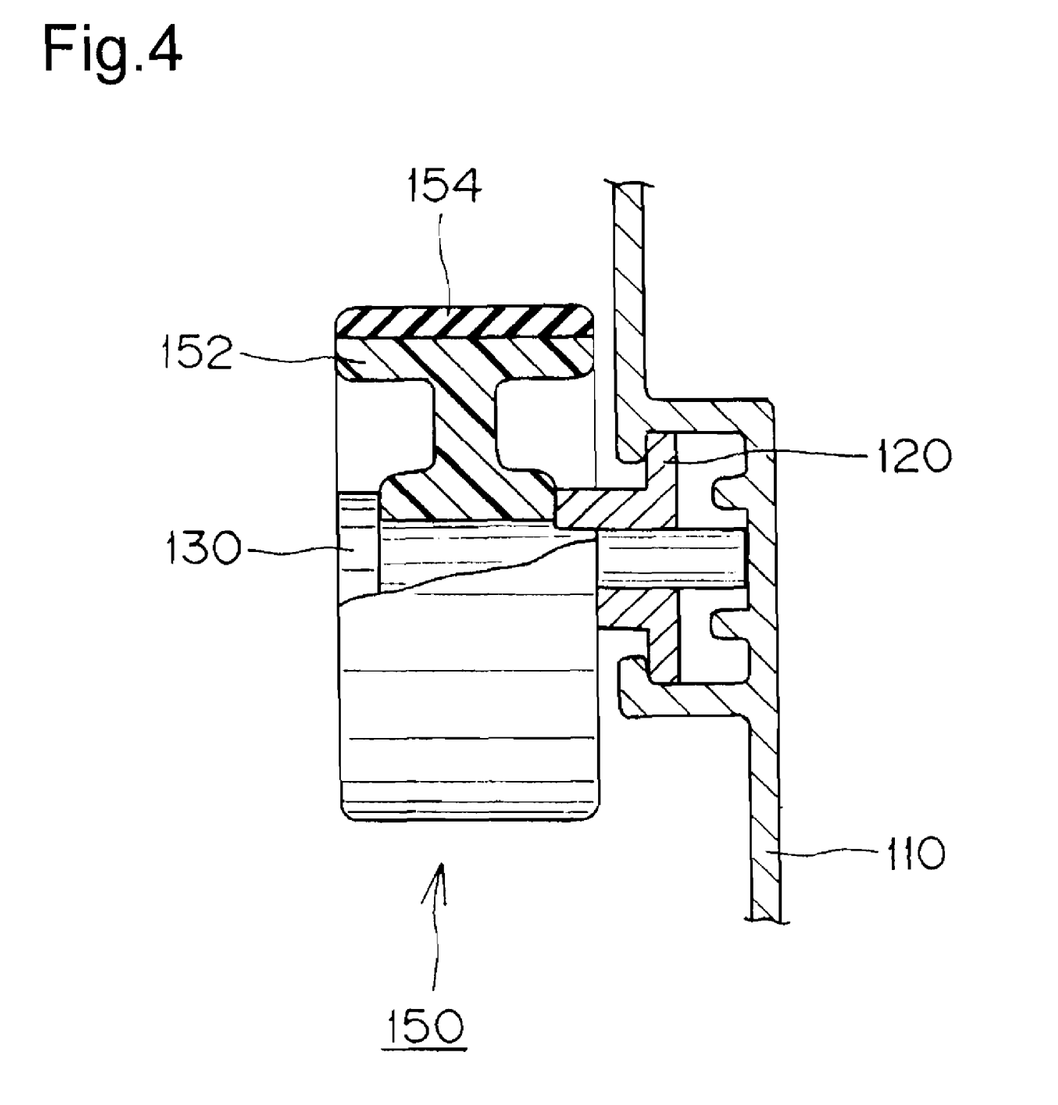
FIG. 4 is a cross-sectional view of a part of a resin roller forming a guide rail for a cable protection and guide device of Example 2.

FIG. 4 is a cross-sectional view of a part of a resin roller 150 forming a guide rail for a cable protection and guide device of Example 2. Since the basic device configuration of the guide rail for the cable protection and guide device of Example 2 is the same as the above described guide rail for the cable protection and guide device 100 of Example 1 except for the structure of the resin roller 150, its description will be omitted.

Resin roller 150 of Example 2 is covered 154 with an elastomer such as urethane. The urethane provides elasticity on an outer circumferential surface of the roller body 152. Roller body 152 is molded of nylon having high hardness and excellent impact resistance. See, FIG. 4.

Resin roller 150 is lightweight. If the cable protection and guide device is moved at high speed, the resin roller 150 is reliably rotated without idling and sliding between the resin roller 150 and the cable protection and guide device. Friction and noise are suppressed and less wear is generated. The impact at the time of contact between the cable protection and guide device and the resin roller is absorbed by the covered layer 154 and sliding noise generated when the cable protection and guide device is moved is reduced.

Example 3

Next, Example 3, which is still another embodiment of the present invention, will be described with reference to FIG. 5.

Figure 5:
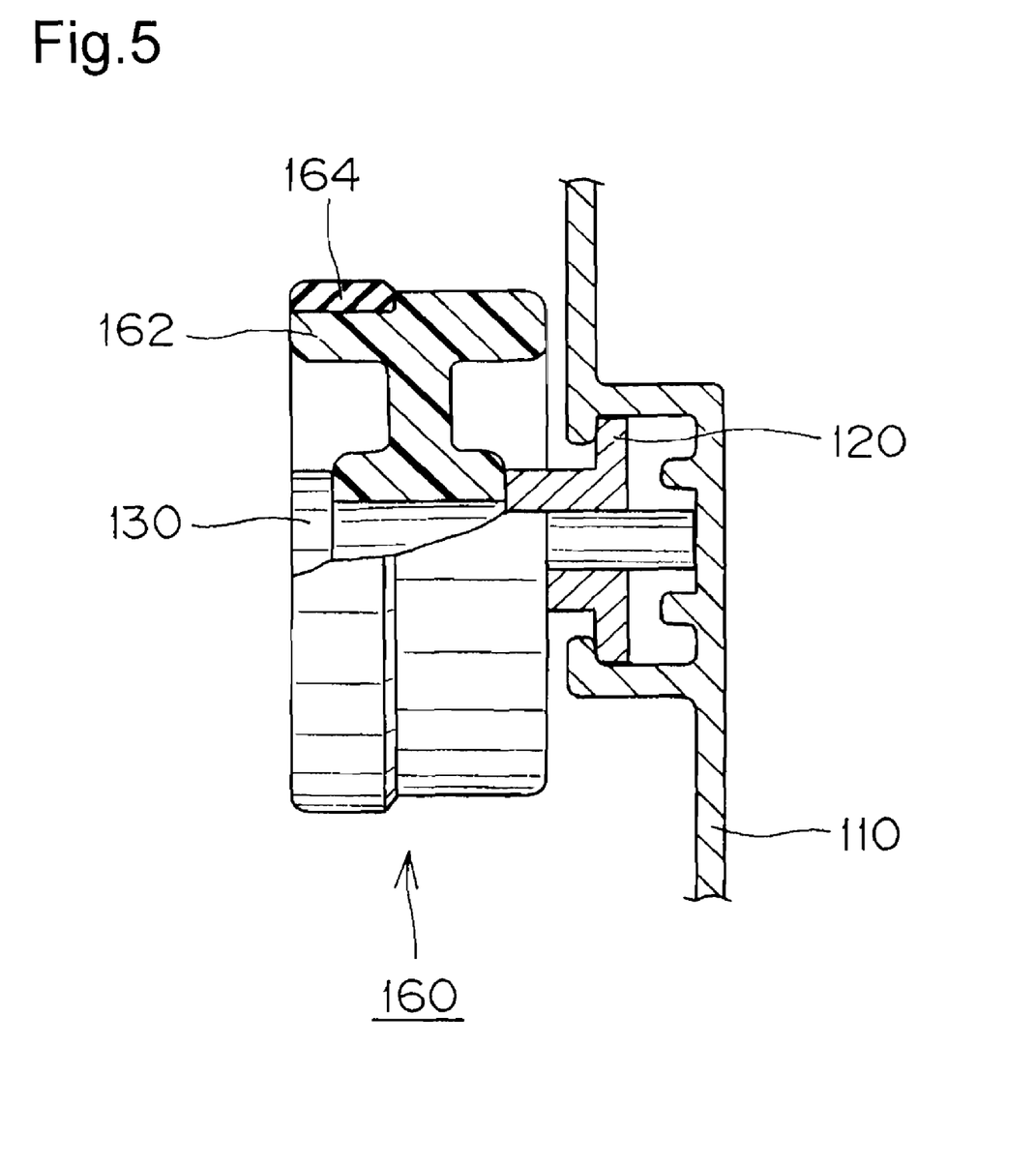
FIG. 5 is a cross-sectional view of a part of a resin roller forming a guide rail for a cable protection and guide device of Example 3.

FIG. 5 is a cross-sectional view of a part of a resin roller 160 forming guide rail for a cable protection and guide device of Example 3. Since the basic device configuration of the guide rail for the cable protection and guide device of Example 3 is the same as the above described guide rail 100 for the cable protection and guide device of Example 1 except for the structure of the resin roller 160, its description will be omitted.

Resin roller 160 forming the guide rail for the cable protection and guide device of Example 3 is provided with a covered layer 164 composed of an elastomer such as urethane. The elastomer provides a roller body 162 having an elastic outer circumferential surface. Roller body 162 is molded of nylon having high hardness and excellent impact resistance. See, FIG. 5.

Even if the weight of cable protection and guide device is large, it is supported by a roller body 162 made of high strength resin. Thus wear of the covered layer 164 can be suppressed. Since the covered layer 164 has a large frictional resistance, the resin roller 160 is reliably rotated without idling and sliding between the resin roller 160 and the cable protection and guide device. Wear is suppressed.

Example 4

Next, Example 4, which is still another embodiment of the present invention, will be described with reference to FIG. 6.

Figure 6:
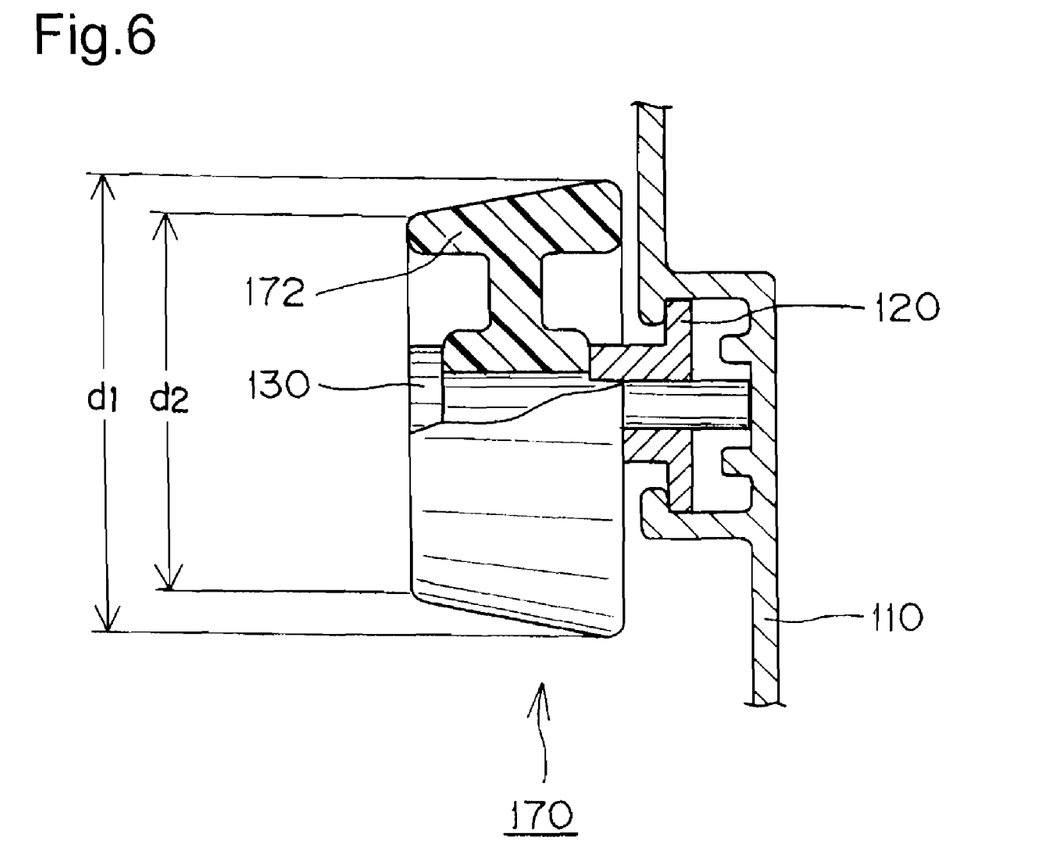
FIG. 6 is a cross-sectional view of a part of a resin roller forming a guide rail for a cable protection and guide device of Example 4.

FIG. 6 is a cross-sectional view of a part of a resin roller 170 forming a guide rail for a cable protection and guide device of Example 4. Since the basic device configuration of the guide rail for the cable protection and guide device of Example 4 is the same as the above described guide rail for the cable protection and guide device 100 of Example 1 except for the structure of the resin roller 170, its description will be omitted.

Resin roller 170 forms, in part, the guide rail for the cable protection and guide device of Example 4. Roller body 172 is molded of nylon having high hardness and excellent impact resistance. Roller body 172 has a non uniform diameter. The diameter is tapered as viewed in FIG. 6 and decreases as shown in FIG. 6. The diameter of the outer circumferential surface of the roller body 172 is illustrated in FIG. 6 such that $d1 > d2$, where d1 is the diameter of the resin roller 170 at the shaft end portion side and d2 is the diameter of the resin roller 170 at the shaft head portion side.

Resin roller 170 applies force upon the cable protection and guide device toward the center or middle of the guide rails of the device. Thus even if the cable protection and guide device is moved at high speed, lateral run out of the cable protection and guide device is suppressed. Sliding between a side surface of the guide rail and a link plate of the cable protection and guide device is reduced and/or is minimized because the link plates roll on the rollers.

Example 5

Next, Example 5, which is still another embodiment of the present invention, will be described with reference to FIG. 7.

Figure 7:
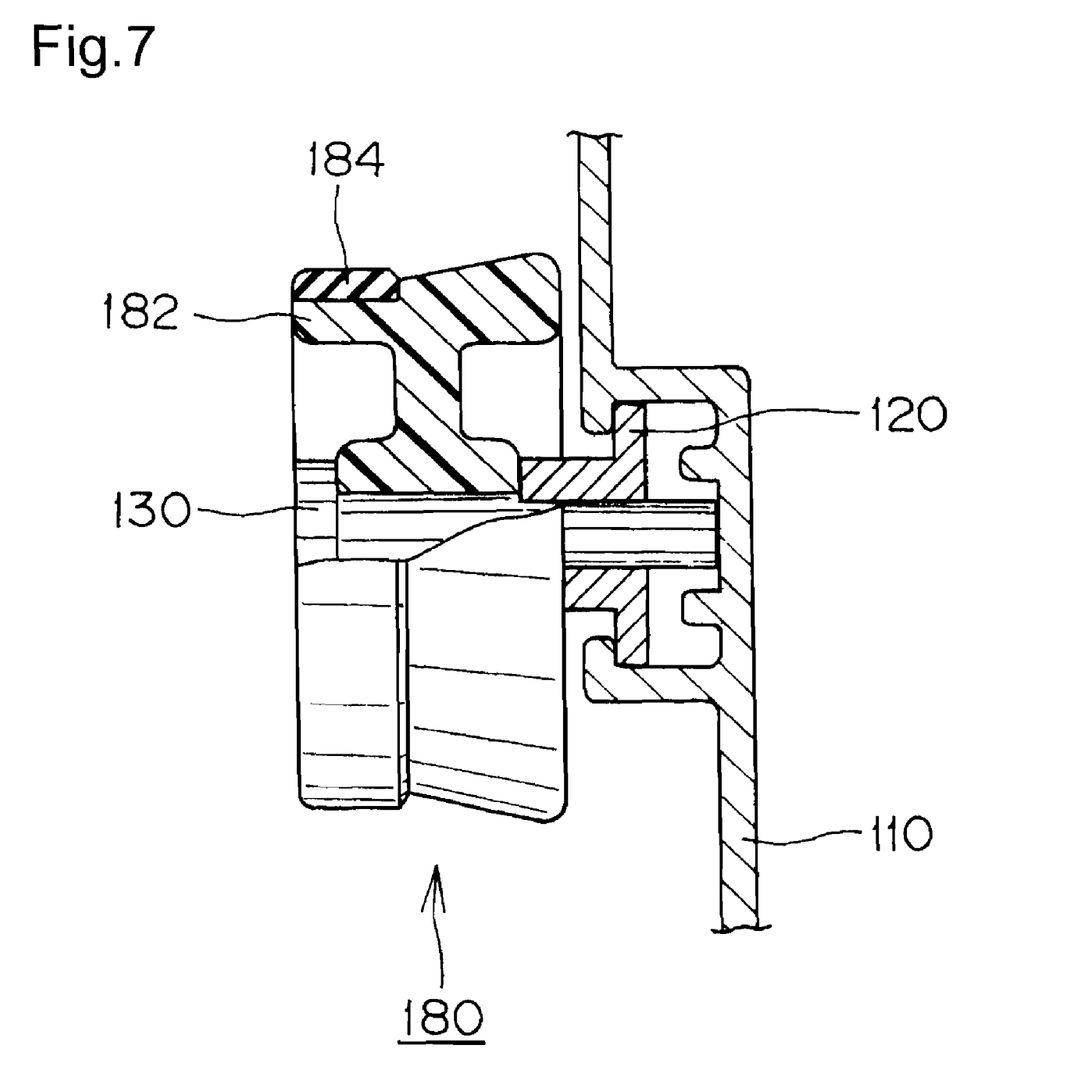
FIG. 7 is a cross-sectional view of a part of a resin roller forming a guide rail for a cable protection and guide device of Example 5.

FIG. 7 is a cross-sectional view of a part of a resin roller 180 forming, in part, a guide rail for a cable protection and guide device of Example 5. Since the basic device configuration of the guide rail for the cable protection and guide device of Example 5 is the same as the above described guide rail for the cable protection and guide device 100 of Example 1 except for the structure of the resin roller 180, its description will be omitted.

Resin roller 180 forms, in part, the guide rail for the cable protection and guide device of Example 5. Roller body 182 includes an outer circumferential surface. Roller body 182 is molded of nylon having high hardness and excellent impact resistance. The diameter from the shaft end portion side toward the shaft head portion side as shown in FIG. 7 is reduced. A portion of the resin roller 180 is covered with layer 184 composed of elastomer such as urethane. The elastomeric layer has elasticity and is provided on the shaft head portion side of the outer circumferential surface of the roller body 182.

Resin roller 180 applies force to cable protection and guide device toward the center of middle of the rails 110. Thus even if the cable protection and guide device is moved at high speed, lateral run out of the cable protection and guide device is suppressed. Sliding between a side surface of the guide rail and a link plate of the cable protection and guide device is reduced and/or is minimized because the link plates roll on the rollers. Covered layer 184 of roller body 182 has a large frictional resistance with respect to the cable protection and guide device, the resin roller 180 is reliably rotated without idling. Thus sliding between the resin roller 180 and the cable protection and guide device is suppressed so that the wear of the cable protection and guide device is reduced or substantially eliminated.

It is noted that in the above-described examples 1 to 5, nylon is used as a material of the roller body of the resin roller. However, if the material has hardness and impact resistance required for the guide rail for the cable protection and guide device, it is not limited to the nylon. For example, an engineering plastic such as alamide resin (Kevlar (trademark)) having high heat resistance and strength can be used to make the roller body.

DESCRIPTION OF REFERENCE NUMERALS

100 . . . Cable protection and guide device
110 . . . Aluminum extrusion molded rail
110a . . . Dovetail groove (of aluminum extrusion molded rail)
110b . . . Mounting section (of aluminum extrusion molded rail)
110c . . . Side wall (of aluminum extrusion molded rail)
120 . . . Shaft supporting member
130 . . . Supporting pin
140, 150, 160, 170, 180 . . . Resin roller
152, 162, 172, 182 . . . Roller body
154, 164, 184 . . . Covered layer
200 . . . Cable protection and guide device
201 . . . Connecting rod (of cable protection and guide device)
202 . . . Link plate (of cable protection and guide device)
205 . . . Fixed end (of cable protection and guide device)
206 . . . Movable end (of cable protection and guide device)
300 . . . Skate unit
400 . . . Guide rail
400a . . . Shelf plate (guide rail)
400b . . . Mounting section (of guide rail)
400c . . . Side wall (of guide rail
B . . . bolt
RC . . . Racing crank bar

The invention claimed is:

1. A guide rail for a cable protection and guide device, comprising:
   a pair of aluminum rails, said pair of rails suppresses lateral run out of said cable protection and guide device;
   said cable protection and guide device extends between a fixed end and a movable end in a longitudinal direction;
   said cable protection and guide device includes a plurality of link frames, each said link frame comprises a pair of right and left spaced link plates;
   said plurality of link frames are articulately connected to each other in a longitudinal direction enabling said pairs of said right and left side plates to form a flexional circumferential bend having a flexional inner circumferential side and flexional outer circumferential side; each of said pairs of said right and left side plates includes a flexional inner circumferential side residing during bending on said flexional inner circumferential side of said bend; each of said pairs of said side plates includes an outer circumferential side residing during bending on said outer flexional circumferential side of said bend;
   connecting rods, said connecting rods are respectively bridged over said flexional outer circumferential side and said flexional inner circumferential side of said link plates;
   said aluminum rails include dovetail grooves;
   said dovetail grooves are formed in opposite surfaces of said pair of aluminum rails and extend longitudinally;
   a plurality of resin rollers, each of said resin rollers being supported by a shaft and a shaft supporting member, said shaft supporting member engaged with said dovetail rail, and, said shaft supporting member movable in said longitudinal direction.

2. A guide rail for a cable protection and guide device according to claim 1, wherein each of said resin rollers includes an outer circumferential surface, said outer circumferential surface being covered with an elastomeric layer.

3. A guide rail for a cable protection and guide device according to claim 1, wherein said outer circumferential surface of said resin roller has a tapered diameter.

4. A guide rail for a cable protection and guide device according to claim 2, wherein said outer circumferential surface of said resin roller has a tapered diameter.

* * * * *